March 20, 1956  S. P. WORDEN ET AL  2,738,676
LARGE RANGE GRAVITY SENSITIVE INSTRUMENT
Filed Jan. 23, 1950  2 Sheets-Sheet 1
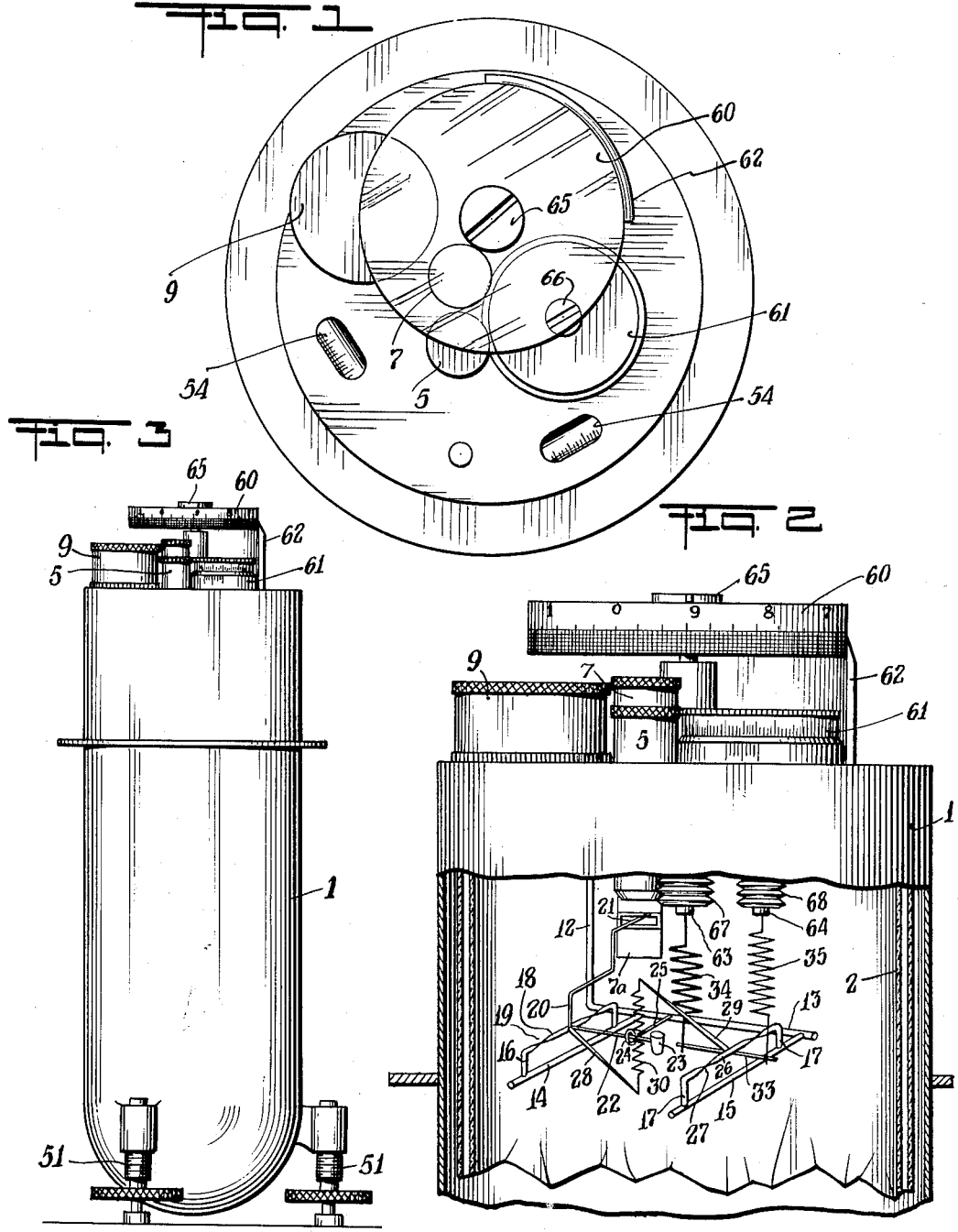
INVENTORS
Samuel P. Worden
Boyd Cornelison
BY
James F. Weiler
ATTORNEY

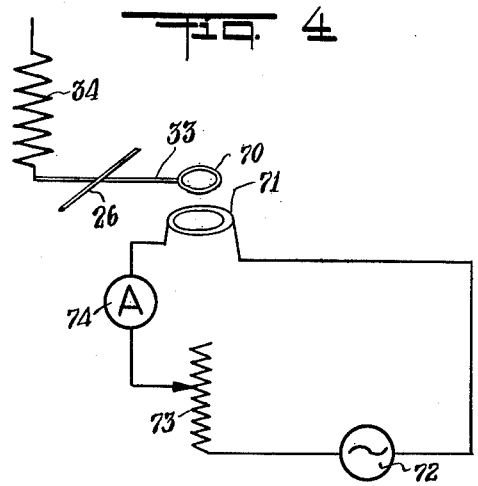
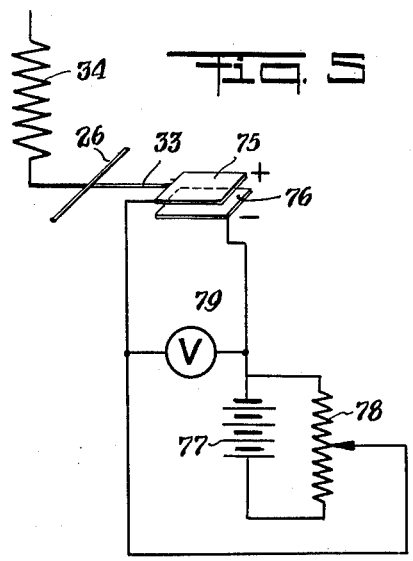
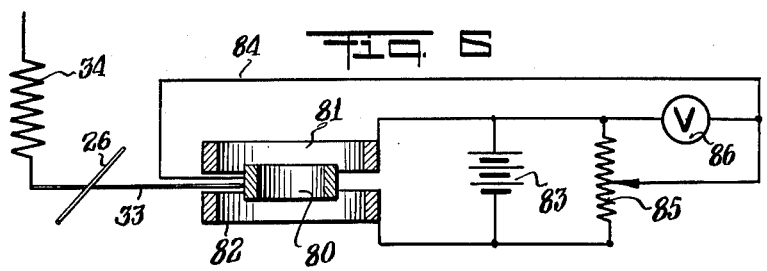

United States Patent Office 2,738,676
Patented Mar. 20, 1956

2,738,676

LARGE RANGE GRAVITY SENSITIVE INSTRUMENT

Samuel P. Worden and Boyd Cornelison, Houston, Tex., assignors, by direct and mesne assignments, to Texas Instruments Incorporated, Dallas, Tex., a corporation of Delaware Application January 23, 1950, Serial No. 140,124

12 Claims. (Cl. 73—382)

This invention relates to a gravity sensitive instrument and more particularly relates to such an instrument which may be used in making measurements of the change in gravity over a large range.

Ordinarily in large range geodetic work gravity sensitive instruments are moved considerable distances and consequently through large changes in gravity and heretofore it has not been possible to obtain accurate null readings of the gravity sensitive member in the conventional types of such instruments. Conventional gravity-sensitive instruments are satisfactory for measurements in a limited area in which gravity changes are relatively small and which changes can be measured with sufficient accuracy by manipulation of a single dial or control means. In oil exploration work over large areas it has been necessary heretofore to move from one area to another by slow and careful overlapping measurements. Manifestly, such a procedure is slow, requires many measurements in which errors are cumulative and, accordingly, is expensive and inaccurate. Moreover, it is impossible to measure changes in gravity across barriers, such as oceans, seas and the like, by such a procedure inasmuch as it is impossible to obtain the necessary intermediate stations to provide the overlapping measurements. Numerous attempts have been made to overcome or obviate this difficulty by providing a single measuring dial, screw or other single means of extremely large range. These attempts have failed because it has not been possible to obtain readings of such large range means with sufficient accuracy to be of value.

Accordingly, it is a prime object of our invention to provide a gravity sensitive instrument which may be used in large range geodetic work and in which the gravity sensitive member may be restored accurately to its null position after a large displacement.

It is a further object of our invention to provide an instrument of the character described which will give an accurate measurement of the change in gravity over a large range.

A further object of our invention is the provision of primary means to approximately null the gravity-sensitive member and the provision of secondary means to complete an accurate nulling after large displacements thereof.

Another object of our invention is the provision of a gravity-sensitive instrument in which the nulling of the gravity-sensitive member is accomplished by separate and independent dial and micrometer arrangements working through independent spring or elastic members acting directly or indirectly through suitable linkage on the gravity-sensitive member.

A still further object of our invention is the provision of a multi-purpose gravity-sensitive instrument which may be used to fix gravity bases throughout large areas in addition to making extremely accurate measurements of changes in gravity at desired locations within these areas.

It is a feature of our invention to provide an instrument of the character described in which one of the micrometer dials utilized in nulling the gravity-sensitive member may be calibrated from the other dial or control means merely by measuring the restoring force necessary by one spring or elastic member or control means to null the gravity-sensitive member after the latter's displacement by another control means.

A still further feature of our invention is the provision of an instrument of the character described which is of extremely simple construction, which is smaller in size, of less weight and more rugged than conventional types of such instruments now in use and which at the same time is of high sensitivity and will permit extremely accurate and delicate measurements over a large range.

The present application is a continuation-in-part of the copending application, Serial No. 790,346, filed December 8, 1947, for a Gravity Meter, now Patent No. 2,674,887, and the present application is concerned with an invention which comprises broadly a plurality of micrometer dials or control means independently and separately actuating relatively strong and weak spring or elastic members or means to null or balance a pivoted beam, the primary micrometer dial being utilized to approximately balance the beam and secondary micrometer or control means being utilized to complete an accurate nulling of the beam.

The above are primary objects and features and other and further objects and advantages will be apparent from the following description taken in connection with the accompanying drawing where like character references designate like parts throughout the several views, and where Fig. 1 is a plan view illustrating the novel dial arrangement of the instrument.

Fig. 2 is a fragmentary elevation, partly in section, of the upper portion of the instrument, and illustrates a preferred embodiment of the invention, Fig. 3 is an elevation of the instrument, Fig. 4 is a fragmentary view illustrating the pivoted beam and nulling means in combination with independent induction nulling means, Fig. 5 is similar to Fig. 4 and illustrates a further modification thereof, and Fig. 6 is similar to Fig. 4 and illustrates electrostatic means in lieu of the induction nulling means.

Referring now more particularly to the drawing, the numeral 1 designates the outer housing of the instrument, which may be of any desired shape and composed of any suitable material; however, a generally cylindrical shape with a rounded bottom is believed to be preferable for the purposes of our invention.

Suspended within the housing from the top or lid thereof, is the evacuated flask 2 which is spaced from the housing throughout and is preferably formed of double walls spaced apart and which serves to provide thermal insulation for the mechanism disposed therein.

Mounted in the top or lid of the housing 1 and extending therethrough and into the inner portion of the flask 2 is the microscope tube 5 which may be provided with any selected lens arrangement and cross-hair, not shown. In order that the null indicating means, described hereinafter, may be clearly visible, we have provided a light tube 7 which extends downwardly through the top of and into the inner flask 2, with the lower end 7a thereof being turned horizontally with its free end upturned underneath the lower end of the microscope tube 5. The upper end of the light tube is closed and in such tube we have provided a source of light, which may be connected by suitable electrical wiring to a battery, preferably carried in the battery housing 9. Various lenses and reflectors may be arranged within the light tube so as to reflect the light through the upturned end of said tube, and inasmuch as such parts are conventional and form no part of this invention, such are not shown, but an arrangement thereof may be had from the said copending application.

Depending from the top of the instrument is the support rod 12 which terminates at its lower end in the horizontally extending arm 13 when the instrument is in operative position. Extending outwardly from the horizontal arm 13 are the supporting rods 14 and 15 disposed in parallel and spaced relationship. Upstanding from the rod 14 are the spaced arms 16 and upstanding from the rod 15 are the similarly spaced arms 17.

A spindle 18 is connected to the upper ends of the arms 16 by the pivots 19 in order that the spindle may freely rotate about its longitudinal axis. While the arrangement illustrated is preferable, the spindle 18 may be mounted in any other preferred manner to the upstanding arms 16 in order that it will rotate freely about its longitudinal axis.

The rod 20 is fixed to and extends upwardly from the spindle 18, the former having its upper end overturned across the upturned end of the tube 7 thus forming a pointer 21 which cooperates with the microscope tube and lighting arrangement previously described. The pointer should be substantially parallel to the longitudinal axis of the spindle 18.

In order that there may be some mass to our elastic system we have provided the mass arm 22 which extends horizontally from the spindle 18 and whose free end carries the mass 23. The mass arm 22 works through the vertically elongated eye 24 formed on the outer end of the supporting rod 25 which, in turn, is fixed to the horizontally extending arm 13 of the rod 12.

Similarly with respect to the upstanding arms 17 we have provided the spindle 26 whose ends may be connected to the upper ends of such arms by means of the torsion ties 27. However, as indicated heretofore, the spindle may be mounted on the arms 17 in any other preferred manner so as to rotate on its longitudinal axis. The spindles 18 and 26 have the arms 28 and 29, respectively, fixed thereto and extending toward each other, the former being located beneath the latter, and the free ends of these arms are connected by means of the mass supporting spring 30.

It should be noted that the helical spring 30 which supports the mass or weight 23 is essentially in a vertical position and is attached to said mass or weight at a point in a vertical plane parallel to the axis of the spindle 18 and passing through the center of gravity of the gravity actuated system. Moreover, to achieve proper sensitivity, the tension spring 30 is attached to a point such that a line from the point through the axis of the spindle 18 forms an angle of approximately 45 degrees with the horizontal plane through said axis of the spindle 18. It is believed that this arrangement reduces stress on the pivot 19 and also the stress on the spring 30. Thus the position of the tension spring 30 relieves the elastic system of undesirably high stresses which results in inaccuracies of operation.

A novel feature of the herein described invention is the means for nulling the instrument. In the arrangement illustrated in Figs. 1, 2 and 3 we have provided the primary dial 60 in order that the gravity sensitive member of the instrument may be approximately restored to null position by setting such dial on one of its major divisions, and a secondary dial 61 to complete the nulling accurately. The dials may be of any suitable material, but the arrangement illustrated shows the dial 60 to be of a transparent material, such as any suitable plastic material, and we have provided the segmental dial guard 62 which extends upwardly from the top of the outer housing and one edge of which may serve as a pointer for the dial. The transparent dial 60 is preferably suitable to the compact arrangement utilized. The dials 60 and 61 may be adjustably secured to suitable shafts by any suitable means, such as by the screws 65 and 66 and the lower ends of the shafts are threaded in the flexible anchors 67 and 68 and have the projections 63 and 64, respectively, connected to the relatively coarse or strong helical spring 34 and the relatively weak or fine helical spring 35. Such shafts and connections are conventional and no detailed description is believed necessary. The lower ends of the springs 34 and 35 are connected to the beam or torque applying arm 33 which is fixed to and projects with a radial component from the spindle 26. While the mass 23 is indicated as the gravity sensitive member it is manifest that the various extending arms are all part of the mass and the spring or elastic arrangement indicated is utilized to move the upper end of the tension spring 30 by means of the arm 29 so as to change the angle of the application of its force. Thus the pointer 21 may be brought into the range of the microscope tube 5 by means of the primary micrometer dial 60, the latter being positioned on one of its major divisions, and the secondary micrometer dial 61 working through the relatively weak spring 35 may be utilized to bring the pointer 21 into an accurately nulled position. Thus a positive and accurate nulling of the gravity sensitive member is brought about by means of the dial arrangement illustrated working through relatively coarse and fine springs, and inaccuracies due to estimation, overlapping readings and inherent in a single dial arrangement are obviated. Any suitable division or subdivisions may be utilized on the dials; however, it is preferable to utilize a division of markings wherein the measured actions of both springs added algebraically give an accurate measurement of the change in gravity over a large range.

It is preferable that the temperature compensating device illustrated and claimed in the said copending application be utilized here, but inasmuch as such is not a part of the present invention, no description thereof is given herein, reference to such copending application being made for the details thereof.

In use the instrument may be set at a selected location and brought to a level as indicated by the spirit levels 54 disposed on top the instrument by properly adjusting the feet 51 on which the instrument is mounted. There are preferably three of these feet, but only two are shown in Fig. 3 and when the instrument is brought to a level, such will be indicated by the spirit levels 54. In large range measurements of changes in gravity, such as establishing gravity basis in exploration work in the oil industry, the instrument may have been moved through a considerable change in latitude and the balance beam 33 may have been displaced by the mass whereby the pointer 21 casts a shadow eccentric with respect to the cross-hair means of the microscope 2, or may be completely out of range thereof. Thereupon primary dial 60 may be manipulated to change the tension of spring 34 to bring the pointer 21 into range and the final nulling may be brought about by means of manipulating secondary dial 61 thereby changing tension on the spring 35 and balancing the system. Thus an extremely accurate nulling of the instrument is effected over a large range. Additional bases may be established in like manner, and measurements may be made within the area by manipulation of the secondary dial only. If desired the primary dial may be removed while making local measurements.

We have illustrated an alternative arrangement in Fig. 4 in which electrical means have been substituted for the weak spring 35 and associated secondary micrometer dial 61. In this embodiment an electrical conductive coil 70, such as copper or aluminum, is disposed at one end of the pivoted beam 33. A fixed coil 71, which may consist of a number of turns of copper wire, is disposed adjacent the coil 70, preferably with their respective axes at right angles. Alternating current is supplied to the coil 71 by an alternating current generator 72 through a variable resistance 73 and an ammeter 74.

In operating or using this embodiment the dial 60 may be manipulated to bring the pointer 21 into range, as described in connection with the preferred embodiment, and alternating or electrical current oscillations are provided in coil 71 whereby a repulsive force is exerted between the coils 70 and 71 thereby completing an accurate nulling of the instrument by the operation of the variable resistance 73, which is measured by the ammeter 74. All other parts are similar to that described in connection with the preferred embodiment of our invention and for a general description of inductive means to balance a gravity sensitive member reference is made to Patent No. 2,277,509 issued to Clewell, March 24, 1942.

An additional modification is illustrated in Fig. 5 in which conductive material 75 in the form of a condenser plate is connected to one end of the pivot beam 33 and a second fixed conductive member 76, forming a second condenser plate is disposed proximate and under the plate 75. The positive pole of the battery 77 is connected in parallel with the variable resistance 78 and the plate 75. The negative pole of the battery is connected to the condenser plate 76. A voltmeter 79 is connected across the plates 75 and 76 to indicate the potential applied through this circuit. Thus in operation, as in the immediately preceding embodiment, the pivoted beam 33 is brought to approximate null position by manipulation of dial 60 and brought to final null position by applying potential to the plates 75 and 76 and measuring the potential applied by means of the voltmeter 79. All other parts are similar to those described above and it is believed that no more description of this modification is necessary.

Fig. 6 illustrates a still further modification in which an electrostatic arrangement is utilized, such as disclosed generally by Clewell, Patent No. 2,243,749 issued May 27, 1941. In this embodiment a non-magnetic electro-conductive segment of a cylinder 80 is connected to one end of the beam 33. Two fixed rings of conductive material 81 and 82 are disposed concentrically about the segment of the cylinder and are spaced from the surface of the cylindrical element 80 by small air gaps, the ring 81 being positioned above and the ring 82 being positioned below the cylinder as illustrated. A battery 83 is connected across the two rings 81 and 82, and, in the arrangement illustrated, the positive pole of the battery is connected to the upper ring 81 and the negative pole to the lower ring 82 and results in the ring 81 being charged positively and ring 82 being charged negatively. This application of potential across the two rings builds up an electrostatic field between the rings and the flux which results flows from the ring 81 into the side of the cylinder 80 and out into the ring 82. While the cylindrical element 80 is in the field of flux supplied by the electrostatic field between the rings 81 and 82, a potential is applied to it by a lead 84 to the battery 83 through a variable resistance 85 which is connected across the battery 83. In the return circuit a voltmeter 86 is placed to indicate the potential applied through this circuit to the cylinder 80. Thus when a potential is applied to the cylinder 80 the flux of the field between the rings 81 and 82 is changed and the cylinder is displaced in the direction of the greatest flux. Inasmuch as the ring 80 is connected to the beam 33 a final nulling of the gravity sensitive member is accomplished by operation of the variable resistance 85 and reading the voltmeter 86.

It will be noted that while the electrical means are preferably secured to a free end of the arm 33 that such means may be connected at any suitable place to the elastic system, such as to spindle 18.

No more alternative arrangements are illustrated inasmuch as any conventional nulling means may be utilized in combination with the elastic means illustrated, such as electromagnetic and other means, all of which are well known in the art; moreover, it is manifest that many changes may be made within the scope of the invention; for example, any suitable elastic system may be utilized in connection with suitable indicating means and it is manifest that a wide range of cooperating nulling means may be utilized. It is essential, however, that the plural nulling means act independently to control the balance of the elastic system with such means being of unequal relative strengths.

Our gravity-sensitive instrument is particularly adapted for remote control operations. A conventional ratchet-relay system may be utilized in connection with one or both of the dials in conjunction with either mechanical or electrical counters. This mechanism is known to and conventional in the art and no detailed description is deemed necessary.

In connection with the electrical embodiments of our invention, if desired, an electrical means many be utilized to null the instrument as an indication of the variation of gravity in combination with additional similar or different electrical means to determine whether the instrument is nulled. For remote control operations this embodiment of our invention is of particular significance as the microscope and light tubes 5 and 7 respectively may be omitted. It is only necessary to establish a reference point in the selected electrical null indicating means, and, as an illustration of this embodiment, measurements of inductance or capacitance may be made to determine whether the instrument is nulled and a second similar measurment as a variation of gravity may be made to null the instrument. Any combination of electrical means known to the art may be used for this purpose and such means may be similar or dissimilar.

A gravity measuring instrument embodying the principles of our invention is easily calibrated in that calibration of one dial may be made from the other dial or indicating means. It is only necessary to measure the force necessary by one spring member to null the instrument after displacement by the other spring member or secondary means; moreover, strong or weak springs may be calibrated by merely tilting the instrument.

It should be noted that while our invention is described in connection with large range gravity measurements the principles thereof may be effectively adapted for purely local measurements by properly selecting the divisions and subdivisions on the null indicating and controlling means. Manifestly, if the markings on the control means are of small range, extremely delicate measurments of the change in gravity may be made by manipulation of the primary and secondary control and indicating means.

A gravity-sensitive instrument embodying the principles of this invention and including the temperature compensating means of the said copending application was used to tie various primary gravity base stations around the world and to establish new stations. In this long range geodetic work in which gravity measurments on a global basis were made a change in gravity of 4000 mgals. was made and the overall accuracy of the results obtained were more than satisfactory. A detailed report of such measurements is set forth in the report of George Prior Wollard, published by Woods Hole Oceanograph Institution of Woods Hole, Mass., Reference No. 49-33, entitled, World Wide Gravity Measurements with a Gravity Meter, and dated July 15, 1949.

Broadly our invention comprises the provisions of a gravity sensitive instrument in which the nulling of the gravity sensitive member is accomplished by separate and independent spring or elastic members or primary and secondary independent nulling means acting directly or indirectly through suitable linkage on the gravity sensitive member, and it is manifest that our invention is of wide scope and use. The drawings and description illustrate what is now considered to be a preferred form of the invention by way of illustration and we intend to limit ourselves only by the scope of the following claims.

We claim:

1. A large range gravity measuring instrument comprising, a mass, a pivoted beam, a yieldable element connected between said pivoted beam and said mass and supporting the latter, said yieldable element being attached to the pivoted beam at a point spaced from its pivotal axis, and adjustable means arranged to rotate the pivoted beam about its said pivotal axis, said adjustable means comprising relatively strong and weak spring members attached to the pivoted beam at points spaced from and on opposite sides of its said pivotal axis, and independent micrometers connected to said relatively strong and weak spring members for shifting said pivoted beam about its said pivotal axis and thereby restoring said pivoted beam to null position.

2. A large range gravity instrument comprising, a pivoted beam, a mass, a yieldable element connected between said pivoted beam and said mass and supporting the latter, said yieldable element being attached to the pivoted beam at a point spaced from its pivotal axis, an arm secured to said pivoted beam and having each of its ends extending outwardly therefrom, and adjustable means arranged to rotate the pivoted beam about its pivotal axis, said adjustable means comprising relatively strong and weak spring members attached one each to an end of said arm, and independent micrometers connected to said spring members whereby independent manipulations of said micrometers shifts the beam about its said pivotal axis and restores the beam to null position.

3. A large range gravity sensitive instrument, including a support shiftable about its longitudinal axis, a mass resiliently suspended from said support at a point spaced from its longitudinal axis, crank means secured to said support and having free extremities extending generally in different directions from the longitudinal axis of said support, and adjustable means arranged to rotate the support about its said longitudinal axis, said adjustable means comprising relatively strong and weak means each connected to a different extremity of said crank means so that manipulation of said strong and weak means shifts said support about its said longitudinal axis thereby controlling the position of said mass, and primary and secondary null actuating means independently connected to said strong and weak means, respectively, whereby said gravity sensitive instrument may be nulled after a large displacement of said mass by manipulation of said null actuating means.

4. A large range gravity sensitive instrument, including a support shiftable about its longitudinal axis, a mass resiliently suspended from said support at a point spaced from its longitudinal axis, crank means linked to said support and having free extremities extending generally in different directions from the longitudinal axis of said support, movement of said crank means shifting the support about its said longitudinal axis, relatively strong and weak means each connected to a different extremity of said crank means so that manipulation of said strong and weak means moves said crank means and thereby shifts said support about its said longitudinal axis thereby controlling the position of said mass, and primary and secondary null-actuating means independently connected to said strong and weak means, respectively, whereby said gravity sensitive instrument may be nulled after displacement of said mass by manipulation of said null-actuating means.

5. The gravity sensitive instrument of claim 4 where at least one of said relatively strong and weak means comprises an element connected to said crank means responsive to displacement thereof, electrical means controlling said element, the said electrical means acting upon said element to null the gravity sensitive instrument, and means for determining the strength of said electrical means as a measure of variation of gravity.

6. The gravity sensitive instrument of claim 5 where the electrical means comprises the relatively weak means to complete nulling of the gravity sensitive instrument.

7. The large range gravity sensitive instrument of claim 4 where the strong means comprises a relatively strong elastic member and the primary null-actuating means comprises a micrometer dial, and where the weak means comprises a variable condenser, said condenser comprising a stationary plate and a movable plate connected to the extremity of the crank means and the secondary null-actuating means includes means to complete a nulling of the large range gravity sensitive instrument as a measure of variation of gravity.

8. The large range gravity meter of claim 4 where the strong means comprises a relatively strong elastic member and the primary null-actuating means comprises a micrometer dial, and where the weak means comprises a conductive member fixed to a free extremity of said crank means, and includes stationary conductive members on opposite sides of said first mentioned conductive member, and said secondary null-actuating means includes means for varying the potential between said first mentioned conductive member and the two stationary conductive members whereby the gravity sensitive instrument is nulled, and includes means for determining the potential as a measure of variation of gravity.

9. The large range gravity meter of claim 4 where the relatively strong means comprises a relatively strong elastic member and the primary null-actuating means comprises a micrometer dial, and where the relatively weak means comprises an electroconductive nonmagnetic element connected to an extremity of the crank means, a stationary conductive coil proximate said element, and the secondary null-actuating means comprises means for generating an alternating field including said conductive member whereby nulling of the gravity sensitive instrument may be completed and includes means to measure the strength of the said field as a measure of variation of gravity.

10. A large range gravity sensitive instrument, including a support shiftable about its longitudinal axis, a mass resiliently suspended from said support at a point spaced from its longitudinal axis, crank means linked to said support and having free extremities extending generally in different directions from the longitudinal axis of said support, movement of said crank means shifting the support about its said longitudinal axis, a plurality of weighing springs of unequal strengths attached to different extremities of said crank means so that manipulation of said weighing springs moves said crank means and thereby shifts said support about its said longitudinal axis thereby controlling the position of said mass, independent micrometers connected to said weighing springs whereby independent manipulation of said micrometer moves said crank means thereby shifting said support about its said longitudinal axis and restores the instrument to null position, and means for observing the position of said support.

11. A large range gravity measuring instrument comprising, a pivoted beam, a mass resiliently suspended from said beam at a point spaced from its longitudinal axis, crank means secured to said beam and having free extremities extending generally in different directions from the longitudinal axis of the beam, and adjustable means arranged to pivot the beam about its said longitudinal axis, said adjustable means comprising relatively strong and weak elastic members each connected to a different extremity of said crank means so that manipulation of said strong and weak elastic members pivots said beam about its said longitudinal axis thereby controlling the position of said mass, primary micrometer means connected to said strong elastic member and having major divisions thereon for restoring said pivoted beam to approximate null position and secondary micrometer means attached so said weak elastic member and having minor subdivisions thereon for completing restoration of said pivoted beam to null position.

12. A large range gravity sensitive instrument, including a support shiftable about its longitudinal axis, a mass resiliently suspended from said support at a point spaced from its longitudinal axis, a torque-applying arm projecting from the support and having a radial component, movement of the torque-applying arm shifting the support about its said longitudinal axis, relatively strong and weak force exerting means each connected at radially spaced points to said torque-applying arm so that manipulation of said strong and weak force exerting means moves said torque-applying arm and thereby shifts said support about its said longitudinal axis thereby controlling the position of said mass, and primary and secondary null-actuating means independently connected to said strong and weak force exerting means, respectively, whereby said gravity sensitive instrument may be nulled after displacement of said mass by manipulation of said null-actuating means.

References Cited in the file of this patent

UNITED STATES PATENTS

| | | |
|---|---|---|
| 1,898,534 | Hartley | Feb. 21, 1933 |
| 2,243,748 | Clewell | May 27, 1941 |
| 2,243,749 | Clewell | May 27, 1941 |
| 2,290,740 | Clewell | July 21, 1942 |
| 2,304,324 | Williams | Dec. 8, 1942 |
| 2,383,997 | Sweet | Sept. 4, 1945 |

FOREIGN PATENTS

| | | |
|---|---|---|
| 455,405 | Great Britain | Oct. 20, 1936 |